(12) United States Patent
Hoffmann et al.

(10) Patent No.: US 9,434,855 B2
(45) Date of Patent: Sep. 6, 2016

(54) POLYMER IN MULTICOAT COLOR AND/OR EFFECT PAINT SYSTEMS

(71) Applicant: BASF Coatings GmbH, Münster (DE)

(72) Inventors: Peter Hoffmann, Senden (DE); Bernhard Steinmetz, Rütschenhausen (DE); Jorn Lavalaye, Würzburg (DE); Hardy Reuter, Münster (DE)

(73) Assignee: BASF Coatings GmbH, Munster (DE)

( * ) Notice: Subject to any disclaimer, the term of this patent is extended or adjusted under 35 U.S.C. 154(b) by 0 days.

(21) Appl. No.: 14/012,198

(22) Filed: Aug. 28, 2013

(65) Prior Publication Data

US 2014/0065428 A1 Mar. 6, 2014

Related U.S. Application Data

(60) Provisional application No. 61/693,816, filed on Aug. 28, 2012.

(51) Int. Cl.
| | | |
|---|---|---|
| *C09D 175/04* | (2006.01) | |
| *C09D 167/00* | (2006.01) | |
| *B05D 7/00* | (2006.01) | |
| *C08G 63/00* | (2006.01) | |
| *C09D 175/06* | (2006.01) | |
| *C08G 18/42* | (2006.01) | |
| *C08G 63/676* | (2006.01) | |
| *C09D 167/08* | (2006.01) | |

(52) U.S. Cl.
CPC ............ *C09D 175/04* (2013.01); *B05D 7/534* (2013.01); *C08G 18/4252* (2013.01); *C08G 63/00* (2013.01); *C08G 63/676* (2013.01); *C09D 167/00* (2013.01); *C09D 167/08* (2013.01); *C09D 175/06* (2013.01); *Y10T 428/31551* (2015.04)

(58) Field of Classification Search
CPC C09D 175/04; C09D 167/00; C09D 167/08; C08G 63/00; C08G 63/676; C08G 18/4252; B05D 7/534; Y10T 428/31551

USPC ............ 428/423.1; 528/295.5; 524/599, 539; 427/379

See application file for complete search history.

(56) References Cited

U.S. PATENT DOCUMENTS

| 3,068,254 | A | * | 12/1962 | Le Bras et al. ............... 560/127 |
| 3,207,709 | A | * | 9/1965 | Rudolf et al. ................. 521/172 |
| 3,850,682 | A | * | 11/1974 | Sturwold et al. ............. 428/395 |
| 5,370,910 | A | * | 12/1994 | Hille et al. ................. 427/407.1 |
| 2012/0034468 | A1 | * | 2/2012 | Low et al. .................... 428/413 |

FOREIGN PATENT DOCUMENTS

| EP | 1990355 | 11/2008 |
| WO | WO-03/106010 | 12/2003 |

* cited by examiner

*Primary Examiner* — Thao T Tran
(74) *Attorney, Agent, or Firm* — Servilla Whitney LLC

(57) ABSTRACT

Disclosed is a polymer which is prepared by reacting
(a) dimer fatty acids with
(b) at least one polyether of general structural formula (I)

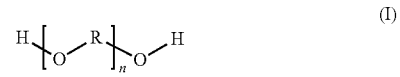

(I)

where R is a $C_3$ to $C_6$ alkylene radical and n is selected accordingly such that said polyether has a number-average molecular weight of 450 to 2200 g/mol, components (a) and (b) are used in a molar ratio of 0.7/2.3 to 1.3/1.7, and the resulting polymer has a number-average molecular weight of 1500 to 5000 g/mol and an acid number <10 mg KOH/g. Also disclosed is a pigmented aqueous basecoat material which comprises this polymer, and the use of said polymer in pigmented aqueous basecoat materials. It further relates to a method for producing multicoat paint systems, and also to the multicoat paint systems producible by means of said method. Moreover, the present invention relates to the refinish of defect areas on multicoat paint systems.

17 Claims, No Drawings

POLYMER IN MULTICOAT COLOR AND/OR EFFECT PAINT SYSTEMS

FIELD OF THE INVENTION

The invention relates to an innovative polymer. It further relates to a pigmented aqueous basecoat material which comprises this polymer, and to the use of said polymer in pigmented aqueous basecoat materials. It further relates to a method for producing multicoat paint systems, and also to the multicoat paint systems producible by means of said method. Moreover, the present invention relates to the refinish of defect areas on multicoat paint systems.

BACKGROUND OF THE INVENTION

The prior art has disclosed a host of methods for producing multicoat color and/or effect paint systems. Known from the prior art (cf., e.g., German patent application DE 199 48 004 A1, page 17, line 37, to page 19, line 22, or German patent DE 100 43 405 C1, column 3, paragraph [0018], and column 8, paragraph [0052], to column 9, paragraph [0057], in conjunction with column 6, paragraph [0039], to column 8, paragraph [0050]) is the following method, which involves (1) applying a pigmented aqueous basecoat material to a substrate,
(2) forming a polymer film from the coating material applied in stage (1),
(3) applying a clearcoat material to the resulting basecoat film, and subsequently
(4) curing the basecoat film together with the clearcoat film.

This method is widely practiced, for example, both for the original (OEM) finishing of motor vehicles, and for the painting of metal and plastic parts for installation in or on vehicles. In the course of these operations, under certain conditions, adhesion problems occur, particularly between basecoat and clearcoat. Furthermore, the method is also used for the refinishing of motor vehicle bodies. This is a reference not only to OEM motor vehicle refinishing, but also to the motor vehicle refinishing which takes place, for example, in a workshop. A particular problem here is the adhesion between the original finish and the basecoat that is used for refinishing.

It was an object of the present invention, therefore, to provide a polymer which can be used to produce coatings which do not have the above-identified disadvantages of the prior art. This relates to an improvement in adhesion both in the painting of metallic and plastics substrates and in automotive refinish. An important factor in the painting of metallic and plastics substrates, as well as the adhesion of the basecoat to the substrate, is the adhesion between basecoat and clearcoat. In the case of automotive refinish, an important factor, alongside the adhesion between basecoat and clearcoat, is the adhesion between basecoat and original finish. This is to be improved especially for use in OEM automotive refinish.

The problems with adhesion are especially marked when the coated substrates are exposed to weathering. The object of the present invention was therefore also to provide coatings which still possess outstanding adhesion properties even after having been exposed to weathering.

In the case of exposure by weathering, poor adhesion is also manifested in particular in an incidence of blisters and swelling. A further object of the present invention, furthermore, was to prevent or reduce the incidence of blisters and swelling.

SUMMARY OF THE INVENTION

This object has surprisingly been achieved by means of a polymer which is preparable by reacting
(a) dimer fatty acids with
(b) at least one polyether of general structural formula (I)

where R is a $C_3$ to $C_6$ alkylene radical and n is selected accordingly such that said polyether has a number-average molecular weight of 450 to 2200 g/mol, components (a) and (b) are used in a molar ratio of 0.7/2.3 to 1.3/1.7, and the resulting polymer has a number-average molecular weight of 1500 to 5000 g/mol and an acid number <10 mg KOH/g.

The condition whereby n is selected such that said polyether has a number-average molecular weight of 450 to 2200 g/mol may be illustrated as follows: Where, for example, R is a tetramethylene radical and the number-average molecular weight is to be 1000 g/mol, n is on average between 13 and 14.

DETAILED DESCRIPTION OF AN EMBODIMENT OF THE INVENTION

Component (a)

Dimer fatty acids are mixtures prepared by oligomerization of unsaturated fatty acids. Starting materials used may be unsaturated $C_{12}$ to $C_{22}$ fatty acids.

In the context of the present invention it is preferred to use $C_{18}$ fatty acids. Particular preference is given to using $C_{18}$ fatty acids, and very particular preference to using linolenic, linoleic and/or oleic acid.

Depending on the reaction regime, the oligomerization referred to above produces a mixture comprising chiefly dimeric, but also trimeric molecules, and also monomeric molecules and other by-products. Purification is normally by distillation. Commercial dimer fatty acids generally contain at least 80% by weight of dimeric molecules, up to 19% by weight of trimeric molecules, and not more than 1% by weight of monomeric molecules and other by-products.

In the context of the present invention it is preferred to use dimer fatty acids which consist to an extent of at least 90% by weight of dimeric molecules, less than 5% by weight of trimeric molecules, and less than 5% by weight of monomeric molecules and other by-products. It is particularly preferred to use dimer fatty acids which consist to an extent of 95% to 98% by weight of dimeric molecules, less than 5% by weight of trimeric molecules, and less than 1% by weight of monomeric molecules and other by-products. Likewise particularly preferred is the use of dimer fatty acids which consist to an extent of at least 98% by weight of dimeric molecules, less than 1.5% by weight of trimeric molecules, and less than 0.5% of monomeric molecules and other by-products.

Depending on reaction regime, dimer fatty acids include both aliphatic and aromatic molecular fragments. The aliphatic molecular fragments can be divided further into linear and cyclic fragments, which in turn may be saturated or unsaturated. By hydrogenation it is possible to convert the aromatic and the unsaturated aliphatic molecular fragments into corresponding saturated aliphatic molecular fragments.

In the context of the present invention it is preferred to use those dimer fatty acids which almost exclusively comprise saturated aliphatic molecular fragments and thus preferably have an iodine number ≥10 g/100 g.

Particularly preferred dimer fatty acids are those which consist to an extent of at least 98% by weight of dimeric molecules, less than 1.5% by weight of trimeric molecules, and less than 0.5% by weight of monomeric molecules and other by-products, and, furthermore, have an iodine number ≥10 g/100 g.

Dimer fatty acids whose use is especially preferred include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Unichema, Empol 1009, Empol 1061, and Empol 1062 from Cognis, and Unidyme 10 and Unidyme TI from Arizona Chemical.

Component (b)

As component (b) at least one polyether is used of general structural formula (I)

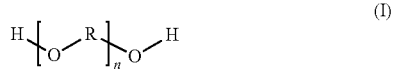

(I)

where R is a $C_3$ to $C_6$ alkyl radical. The index n should be selected in each case such that said polyether has a number-average molecular weight of 450 to 2200 g/mol. More preferably it has a number-average molecular weight of 700 to 1400 g/mol, and very preferably of 800 to 1200 g/mol. The number-average molecular weight is measured by means of gel permeation chromatography against a polymethyl methacrylate standard; eluent: tetrahydrofuran.

In the polyether for use in accordance with the invention, all n radicals R may be the same. Similarly, however, it is also possible for different kinds of radicals R to be present. Preferably all of the radicals R are the same.

R is preferably a $C_3$ or $C_4$ alkylene radical. More preferably it is an isopropylene radical or a tetramethylene radical.

With very particular preference the polyether for use in accordance with the invention is polypropylene glycol or polytetrahydrofuran.

The preparation of the polymer of the invention has no peculiarities. The esterification is accomplished typically by means of a water separator. In that case components (a) and (b) are used in a molar ratio of 0.7/2.3 to 1.3/1.7, preferably of 0.8/2.2 to 1.2/1.8, and very preferably 0.9/2.1 to 1.1/1.9. The reaction is discontinued when the polymer of the invention has an acid number of <10 mg KOH/g. Preferably it has an acid number of <7.5 mg KOH/g, and very preferably of <5 mg KOH/g. The acid number here is determined by means of DIN 53402.

The resulting polymer has a number-average molecular weight of 1500 to 5000 g/mol, preferably 2000 to 4500 g/mol, and very preferably 3000 to 4000 g/mol. The number-average molecular weight is measured by gel permeation chromatography against a polymethyl methacrylate standard; eluent: tetrahydrofuran.

The water solubility of the polymers of the invention is low. If they are used in aqueous systems, they accumulate at the interfaces, owing to their incompatibility, and are therefore capable of contributing to an improvement in the adhesion to adjacent layers.

If a number-average molecular weight of 5000 g/mol is exceeded, then the solubility of the polymers of the invention in aqueous systems becomes so low that they tend towards crystallization and may undergo precipitation. If the number-average molecular weight is below 1500 g/mol, then the water solubility of said polymer is increased to such an extent that it is no longer able to accumulate in sufficient concentration at the interfaces. In that case an improvement in adhesion is no longer achievable.

Particularly preferred embodiments are specified below:

a) In one particularly preferred embodiment of the polymer of the invention, the dimer fatty acid is prepared from linolenic, linoleic and/or oleic acid, consists to an extent of at least 98% by weight of dimeric molecules, less than 1.5% by weight of trimeric molecules, and less than 0.5% by weight of monomeric molecules and other by-products, and has an iodine number of ≥10 g/100 g.

b) In another particularly preferred embodiment of the polymer of the invention, the polyether for use in accordance with the invention is polypropylene glycol or polytetrahydrofuran and furthermore, has a number-average molecular weight of 800 to 1200 g/mol.

c) In another particularly preferred embodiment of the polymer of the invention, components (a) and (b) are used in a molar ratio of 0.9/2.1 to 1.1/1.9.

d) In another particularly preferred embodiment of the polymer of the invention, it has an acid number of <5 mg KOH/g.

e) In another particularly preferred embodiment of the polymer of the invention, it has a number-average molecular weight of 3000 to 4000 g/mol.

In one especially preferred embodiment of the polymer of the invention, all of the features indicated under a) to e) are realized in combination.

The present invention further relates to a pigmented aqueous basecoat material which comprises at least one polymer of the invention.

A basecoat material is a color-imparting intermediate coating material which is used in motor vehicle finishing and general industrial coating. It is applied generally to a metallic or plastics substrate which has been pretreated with a primer or primer-surfacer, and occasionally is even applied directly to the plastics substrate. Substrates used may also include existing finishes, which may also need to be pretreated (by sanding, for example). It is now entirely customary for more than one basecoat film to be applied. In such a case, accordingly, a first basecoat film constitutes the substrate for a second. In order to protect a basecoat film against environmental effects, in particular, at least one additional clearcoat film is applied over it.

The sum total of the weight-percentage fractions, based on the total weight of the pigmented aqueous basecoat material, of all of the polymers according to the invention is preferably 0.1% to 30% by weight, more preferably 1% to 20% by weight, and very preferably 1.5% to 15% by weight or even 2% to 12% by weight.

Where the amount of the polymer of the invention is below 0.1% by weight, it may be that no improvement in adhesion is achieved any longer. Where the amount is more than 30% by weight, there may under certain circumstances be disadvantages, such as an incompatibility of said polymer in the basecoat material, for example. Such incompatibility may be manifested, for example, in uneven flow and also in floating or sedimentation.

As already described above, the polymer of the invention is of low solubility in aqueous systems. It is therefore preferably used directly in the preparation of the pigmented aqueous basecoat material, and not only added, following preparation, to the other wise completed basecoat material.

In one preferred embodiment, the sum total of the weight-percentage fractions of all of the polymers according to the invention is 0.1% to 30% by weight, based on the total weight of the pigmented aqueous basecoat material. Where preferred embodiments of the polymers of the invention are used, the sum total of the weight-percentage fractions of all preferred embodiments of the polymers of the invention is preferably likewise 0.1% to 30% by weight, based on the total weight of the pigmented aqueous basecoat material. With particular preference, the pigmented aqueous basecoat material comprises exclusively, as polymers of the invention, preferred embodiments of the polymers of the invention.

In one preferred embodiment, the sum total of the weight-percentage fractions of all of the polymers according to the invention is 1% to 20% by weight, based on the total weight of the pigmented aqueous basecoat material. Where preferred embodiments of the polymers of the invention are used, the sum total of the weight-percentage fractions of all preferred embodiments of the polymers of the invention is preferably likewise 1% to 20% by weight, based on the total weight of the pigmented aqueous basecoat material. With particular preference, the pigmented aqueous basecoat material comprises exclusively, as polymers of the invention, preferred embodiments of the polymers of the invention.

In one especially preferred embodiment, the sum total of the weight-percentage fractions of all of the polymers according to the invention is 1.5% to 15% by weight, based on the total weight of the pigmented aqueous basecoat material. Where preferred embodiments of the polymers of the invention are used, the sum total of the weight-percentage fractions of all preferred embodiments of the polymers of the invention is preferably likewise 1.5% to 15% by weight, based on the total weight of the pigmented aqueous basecoat material. With particular preference, the pigmented aqueous basecoat material comprises exclusively, as polymers of the invention, preferred embodiments of the polymers of the invention.

In one likewise especially preferred embodiment, the sum total of the weight-percentage fractions of all of the polymers according to the invention is 2% to 12% by weight, based on the total weight of the pigmented aqueous basecoat material. Where preferred embodiments of the polymers of the invention are used, the sum total of the weight-percentage fractions of all preferred embodiments of the polymers of the invention is preferably likewise 2% to 12% by weight, based on the total weight of the pigmented aqueous basecoat material. With particular preference, the pigmented aqueous basecoat material comprises exclusively, as polymers of the invention, preferred embodiments of the polymers of the invention.

Examples of embodiments of the polymers of the invention that are preferred in this context include the following particularly preferred embodiments:
a) In one particularly preferred embodiment of the polymer of the invention, the dimer fatty acid is prepared from linolenic, linoleic and/or oleic acid, consists to an extent of at least 98% by weight of dimeric molecules, less than 1.5% by weight of trimeric molecules, and less than 0.5% by weight of monomeric molecules and other by-products, and has an iodine number of ≥10 g/100 g.
b) In another particularly preferred embodiment of the polymer of the invention, the polyether for use in accordance with the invention is polypropylene glycol or polytetrahydrofuran and, furthermore, has a number-average molecular weight of 800 to 1200 g/mol.
c) In another particularly preferred embodiment of the polymer of the invention, components (a) and (b) are used in a molar ratio of 0.9/2.1 to 1.1/1.9.
d) In another particularly preferred embodiment of the polymer of the invention, it has an acid number of <5 mg KOH/g.
e) In another particularly preferred embodiment of the polymer of the invention, it has a number-average molecular weight of 3000 to 4000 g/mol.

As a further example of embodiments of the polymers of the invention that are preferred in this context, mention may be made of that embodiment in which all of the features indicated under a) to e) are realized in combination.

The basecoat materials used in accordance with the invention comprise color and/or effect pigments. Such color pigments and effect pigments are known to the skilled person and are described for example in Römpp-Lexikon Lacke and Druckfarben, Georg Thieme Verlag, Stuttgart, New York, 1998, pages 176 and 451. The fraction of the pigments may be situated for example in the range from 1% to 40% by weight, preferably 2% to 30% by weight, more preferably 3% to 25% by weight, based on the total weight of the pigmented aqueous basecoat material.

For the purposes of the present invention it is preferred to use basecoat materials which as binders comprise binders curable physically, thermally or both thermally and with actinic radiation.

Besides the polymer of the invention, the pigmented aqueous basecoat materials of the invention comprise with particular preference at least one polyurethane resin. Coating materials of this kind comprising polyurethane resin may likewise be typically cured physically, thermally, or both thermally and with actinic radiation.

In the context of the present invention, the term "physical curing" denotes the formation of a film by release of solvent from polymer solutions or polymer dispersions. Typically, no crosslinking agents are necessary for this purpose.

In the context of the present invention, the term "thermal curing" denotes the heat-initiated crosslinking of a coating film where in the parent coating material either a separate crosslinking agent or else self-crosslinking binders are employed. The crosslinking agent comprises reactive functional groups which are complementary to the reactive functional groups present in the binders. This is typically referred to by those in the art as external crosslinking. Where the complementary reactive functional groups or autoreactive functional groups, i.e., groups which react with groups of the same kind, are already present in the binder molecules, the binders are self-crosslinking. Examples of suitable complementary reactive functional groups and autoreactive functional groups are known from German patent application DE 199 30 665 A1, page 7, line 28 to page 9, lines 24.

In the context of the present invention, actinic radiation means electromagnetic radiation such as near infrared (NIR), UV radiation, more particularly UV radiation, and particulate radiation such as electron radiation. Curing by UV radiation is typically initiated by radical or cationic photoinitiators.

Where thermal curing and curing with actinic light are employed jointly, the term "dual cure" is also used.

In the present invention, preferred basecoat materials are those which are curable physically and those which are curable thermally or both thermally and with actinic radiation, in other words by "dual cure".

Preferred thermally curing basecoat materials are those which comprise a polyurethane resin binder and as crosslinking agent an amino resin or a blocked or nonblocked polyisocyanate, preferably an amino resin. Among the amino resins, melamine resins are preferred.

The polyurethane resin preferably present may be ionically and/or nonionically hydrophilically stabilized. In preferred embodiments of the present invention, the polyurethane resin is ionically hydrophilically stabilized. The preferred polyurethane resins are linear or contain branches. Particular preference is given to a polyurethane resin in whose presence olefinically unsaturated monomers have been polymerized. The polyurethane resin (A) here may be present in addition to the polymer originating from the polymerization of the olefinically unsaturated monomers, without these monomers being bonded covalently to one another. Also possible, however, is for the polyurethane resin (A) to be bonded covalently to the polymer originating from the polymerization of the olefinically unsaturated monomers. The olefinically unsaturated monomers are preferably monomers containing acrylate and/or methacrylate groups. It is likewise preferred for the monomers containing acrylate and/or methacrylate groups to be used in combination with further olefinically unsaturated compounds that do not contain any acrylate or methacrylate groups. Olefinically unsaturated monomers attached to the polyurethane resin (A) are more preferably monomers containing acrylate groups or methacrylate groups, producing polyurethane (meth)acrylates. With very particular preference the polyurethane resin is a polyurethane (meth)acrylate. The polyurethane resin preferably present is curable physically, thermally, or thermally and with actinic radiation. More particularly it is curable thermally or both thermally and with actinic radiation. With particular preference the polyurethane resin comprises reactive functional groups through which external crosslinking is possible.

Suitable saturated or unsaturated polyurethane resins are described for example in
  German patent application DE 199 14 896 A1, column 1, lines 29 to 49 and column 4, line 23 to column 11, line 5;
  German patent application DE 199 48 004 A1, page 4, line 19 to page 13, line 48;
  European patent application EP 0 228 003 A1, page 3, line 24 to page 5, line 40;
  European patent application EP 0 634 431 A1, page 3, line 38 to page 8, line 9; or
  international patent application WO 92/15405, page 2, line 35 to page 10, line 32.

For the preparation of the polyurethane resin it is preferred to make use of the aliphatic, cycloaliphatic, aliphatic-cycloaliphatic, aromatic, aliphatic-aromatic and/or cycloaliphatic-aromatic polyisocyanates known to the skilled person.

As an alcohol component for preparing the polyurethane resins it is preferred to use the saturated and unsaturated, relatively high molecular mass and low molecular mass, polyols and also, optionally, monoalcohols in minor amounts, that are known to the skilled person. Low molecular mass polyols used are more particularly diols and, in minor amounts, triols for the purpose of introducing branches. Examples of suitable polyols of relatively high molecular mass are saturated or olefinically unsaturated polyester polyols and/or polyether polyols. Relatively high molecular mass polyols used more particularly are polyester polyols, especially those having a number-average molecular weight of 400 to 5000 g/mol (measured by gel permeation chromatography against a polymethyl methacrylate standard, with tetrahydrofuran as eluent).

For the hydrophilic stabilization and/or for increasing the dispersibility in aqueous medium, the polyurethane resin preferably present may comprise particular ionic groups and/or groups which can be converted into ionic groups (potentially ionic groups). Such polyurethane resins are referred to in the context of the present invention as ionically hydrophilically stabilized polyurethane resins. Likewise present may be nonionic hydrophilically modifying groups. Preference is given, however, to the ionically hydrophilically stabilized polyurethanes. More specifically the modifying groups are
  functional groups which can be converted into cations by neutralizing agents and/or quaternizing agents and/or cationic groups (cationic modification)
or
  functional groups which can be converted into anions by neutralizing agents, and/or anionic groups (anionic modification)
and/or
  nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted into cationic groups by neutralizing agents and/or quaternizing agents). Also noteworthy are the cationic groups prepared from the aforementioned functional groups using neutralizing agents and/or quaternizing agents known to the skilled person, such as primary, secondary, tertiary and/or quaternary ammonium groups, tertiary sulfonium groups and/or quaternary phosphonium groups, more particularly quaternary ammonium groups and tertiary sulfonium groups.

The functional groups for anionic modification are, as is known, for example, carboxylic, sulfonic and/or phosphonic acid groups, more particularly carboxylic acid groups (functional groups which can be converted into anionic groups by neutralizing agents), and also anionic groups prepared from the aforementioned functional groups using neutralizing agent known to the skilled person, such as carboxylate, sulfonate and/or phosphonate groups.

The functional groups for nonionic hydrophilic modification are preferably poly(oxyalkylene) groups, more particularly polyoxyethylene) groups.

The ionically hydrophilic modifications may be introduced into the polyurethane resin by monomers which comprise the (potentially) ionic groups. The nonionic modifications are introduced, for example, through the incorporation of poly(ethylene) oxide polymers as side groups or terminal groups of the polyurethane molecules. The hydrophilic modifications are introduced, for example, via compounds which comprise at least one group that is reactive toward isocyanate groups, preferably at least one hydroxyl group. For introducing the ionic modification it is possible to use monomers which as well as the modifying groups comprise at least one hydroxyl group. For introducing the nonionic modifications it is preferred to use the alkoxypoly (oxyalkylene) alcohols and/or polyetherdiols that are known to the skilled person.

The polyurethane resin may preferably be a graft polymer. More particularly it is a polyurethane resin grafted using olefinically unsaturated compounds, preferably olefinically unsaturated monomers. In this case, therefore, the polyurethane is grafted, for example, with side groups and/or side chains that are based on olefinically unsaturated monomers. The groups or chains in question are more particularly side chains based on poly(meth)acrylates. Poly(meth)acrylates in the context of the present invention are polymers or polymeric radicals which comprise monomers containing acrylate and/or methacrylate groups, and preferably consist of monomers containing acrylate and/or methacrylate groups. Side chains based on poly(meth)acrylates are side chains which are constructed during graft polymerization using monomers containing (meth)acrylate groups. In this case, during the graft polymerization, preferably more than 50 mol %, more particularly more than 75 mol %, more particularly 100 mol % of monomers containing (meth) acrylate groups are used, based on the total amount of the monomers used in the graft polymerization.

The side chains described are introduced into the polymer preferably after the preparation of a primary polyurethane resin dispersion. In this case the polyurethane resin present in the primary dispersion may comprise pendant and/or terminal olefinically unsaturated groups, via which the graft polymerization with the olefinically unsaturated compounds then proceeds. The polyurethane resin for grafting may therefore be an unsaturated polyurethane resin (A). The graft polymerization is in that case a radical polymerization of olefinically unsaturated reactants. Also possible, for example, is for the olefinically unsaturated compounds used for the graft polymerization to comprise at least one hydroxyl group. In that case it is also possible initially for there to be attachment of the olefinically unsaturated compounds via these hydroxyl groups, by reaction with free isocyanate groups of the polyurethane resin. This attachment occurs instead of or in addition to the radical reaction of the olefinically unsaturated compounds with any pendant and/or terminal olefinically unsaturated groups that may be present in the polyurethane resin. This is then followed, again, by the graft polymerization via radical polymerization as described earlier on above. In each case, polyurethane resins are obtained that are grafted with olefinically unsaturated compounds, preferably olefinically unsaturated monomers.

As olefinically unsaturated compounds with which the polyurethane resin (A) is preferably grafted it is possible to use virtually all radically polymerizable, olefinically unsaturated and organic monomers that are available to the skilled person for these purposes. A number of preferred monomer classes may be cited as examples:

hydroxyalkyl esters of (meth)acrylic acid or of other alpha,beta-ethylenically unsaturated carboxylic acids, (meth)acrylic acid alkyl esters and/or cycloalkyl esters having up to 20 carbon atoms in the alkyl radical, ethylenically unsaturated monomers, comprising at least one acid group, more particularly precisely one carboxyl group, such as (meth)acrylic acid, vinyl esters of monocarboxylic acids branched in alpha position and having 5 to 18 carbon atoms, reaction products of (meth)acrylic acid with the glycidyl ester of a monocarboxylic acid branched in alpha position and having 5 to 18 carbon atoms, other ethylenically unsaturated monomers such as olefins (for example ethylene), (meth)acrylamides, vinylaromatic hydrocarbons (styrene for example), and vinyl compounds such as vinyl chloride and/or vinyl ethers such as ethyl vinyl ethers.

Preference is given to using monomers containing (meth) acrylate groups, and so the grafted-on side chains are poly(meth)acrylate-based side chains.

The pendant and/or terminal olefinically unsaturated groups in the polyurethane resin, via which graft polymerization with the olefinically unsaturated compounds is able to proceed, are introduced into the polyurethane resin preferably by way of certain monomers which as well as an olefinically unsaturated group also comprise, for example, at least one group reactive toward isocyanate groups. Hydroxyl groups and also primary and secondary amino groups are preferred. Hydroxyl groups are especially preferred.

Of course, the monomers described by which the pendant and/or terminal olefinically unsaturated groups may be introduced into the polyurethane resin may also be employed without the polyurethane resin being additionally grafted thereafter with olefinically unsaturated compounds. It is preferred, however, for the polyurethane resin to be grafted with olefinically unsaturated compounds.

The polyurethane resin preferably present may be a self-crosslinking and/or externally crosslinking binder. The polyurethane resin preferably comprises reactive functional groups through which external crosslinking is possible. In this case, the pigmented aqueous basecoat material preferably comprises at least one crosslinking agent. More particularly, the reactive functional groups through which external crosslinking is possible are hydroxyl groups. For the purposes of the method of the invention it is possible with particular advantage to use polyhydroxy-functional polyurethane resins. This means that the polyurethane resin contains on average more than one hydroxyl group per molecule.

The polyurethane resin is prepared by the typical methods of polymer chemistry. This means, for example, the polymerization of polyisocyanates and polyols to polyurethanes, and the graft polymerization that preferably then follows with olefinically unsaturated compounds. These techniques are known to the skilled person and may be adapted individually. Exemplary preparation processes and reaction conditions are found in European patent EP 0 521 928 B1, page 2, line 57 to page 8, line 16.

By film-forming solids is meant the nonvolatile weight fraction of the basecoat material, excluding pigments and any fillers. The film-forming solids can be determined as follows: A sample of the pigmented aqueous basecoat material (approximately 1 g) is admixed with 50 to 100 times the amount of tetrahydrofuran and then stirred for about 10 minutes. The insoluble pigments and any fillers are then removed by filtration, and the residue is rinsed with a little THF, after which the THF is removed from the resultant filtrate on a rotary evaporator. The filtrate residue is dried at 120° C. for two hours and the film-forming solids that results in this drying operation is weighed.

The polyurethane resin content is preferably between 5% and 80%, more preferably between 8% and 70%, and very preferably between 10% and 60%, by weight, based in each case on the film-forming solids of the basecoat material.

The polyurethane resin preferably present possesses preferably a number-average molecular weight of 200 to 30 000 g/mol, more preferably of 2000 to 20 000 g/mol (measured by means of gel permeation chromatography against a polymethyl methacrylate standard; tetrahydrofuran is employed as eluent). It additionally possesses, for example, a hydroxyl number of 0 to 250 mg KOH/g, but more particularly of 20 to 150 mg KOH/g. The acid number of the polyurethane resin is preferably 5 to 200 mg KOH/g, more particularly 10 to 40 mg KOH/g. The hydroxyl number is determined in accordance with DIN/ISO 4629, the acid number in accordance with DIN 53402.

The pigmented aqueous basecoat material to be used may further comprise at least one polyester, more particularly a polyester having a number-average molecular weight of 400 to 5000 g/mol (measured by means of gel permeation chromatography against a polymethyl methacrylate standard; tetrahydrofuran is used as eluate). Corresponding polyesters are described in DE 4009858 in column 6, line 53 to column 7, line 61 and column 10, line 24 to column 13, line 3.

Preferably, moreover, a thickener is present. Suitable thickeners are inorganic thickeners from the group of the phyllosilicates. Besides the inorganic thickeners, however, it is also possible to use one or more organic thickeners. These organic thickeners are preferably selected from the group consisting of (meth)acrylic acid-(meth)acrylate copolymer thickeners, such as, for example, the commercial product Viscalex HV30 (Ciba, BASF), and polyurethane thickeners, such as, for example, the commercial product DSX® 1550 from Cognis. The thickeners used are different from the binders used.

The pigmented aqueous basecoat material may also, furthermore, comprise at least one additive. Examples of such additives are salts which can be decomposed thermally without residue or substantially without residue, resins as binders, which are curable physically, thermally and/or with actinic radiation and are different from polyurethane resins, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, radical-polymerization initiators, adhesion promoters, flow control agents, film-forming assistants, sag control agents (SCAs), flame retardants, corrosion inhibitors, waxes, siccatives, biocides, and matting agents.

Suitable additives of the aforementioned kind are known for example from
- German patent application DE 199 48 004 A1, page 14, line 4, to page 17, line 5,
- German patent DE 100 43 405 C1, column 5, paragraphs [0031] to [0033].

They are used in the customary and known amounts.

The solids content of the basecoat materials used in accordance with the invention may vary according to the requirements of the individual case. First and foremost the solids content is guided by the viscosity that is required for application, more particularly spray application, and so it may be set by the skilled person on the basis of his or her general art knowledge, with the assistance where appropriate of a few rangefinding tests.

The solids content of the basecoat materials is preferably 5% to 70%, more preferably 8% to 60%, and with particular preference 12% to 55%, by weight.

By solids content is meant that weight fraction which remains as a residue on evaporation under defined conditions. In the present specification, the solids has been determined in accordance with DIN EN ISO 3251. For this the coating material is evaporated at 130° C. for 60 minutes.

The basecoat materials used in accordance with the invention can be prepared using the mixing methods and mixing assemblies that are customary and known for producing basecoat materials.

A further aspect of the present invention is a method for producing a multicoat paint system by (1) applying a pigmented aqueous basecoat material to a substrate,
(2) forming a polymer film from the coating material applied in stage (1),
(3) applying a clearcoat material to the resulting basecoat film, and subsequently
(4) curing the basecoat film together with the clearcoat film, which is characterized in that in stage (1) a pigmented aqueous basecoat material is used that comprises the polymer of the invention. All details given above for the polymer of the invention and for the pigmented aqueous basecoat material are also applicable to the inventive use. This applies additionally, not least, to all preferred, more preferred, and very preferred features.

The said method is used preferably for producing multicoat color paint systems, effect paint systems, and color and effect paint systems.

The pigmented aqueous basecoat material used in accordance with the invention is applied typically to metallic or plastics substrates which have been pretreated with a primer or primer-surfacer. The said basecoat material may optionally also be applied directly to the plastics substrate.

If a metallic substrate is to be coated, it is preferably also coated with an electrodeposition coat before the primer or primer-surfacer is applied.

If a plastics substrate is being coated, it is preferably also pretreated before the primer or primer-surfacer is applied. The techniques most frequently employed for such pretreatment are flaming, plasma treatment, and corona discharge. It is preferred to use flaming.

The application of the pigmented aqueous basecoat material used in accordance with the invention to a metallic substrate may take place in the film thicknesses that are customary in the context of the motor vehicle industry, in the range from, for example, 5 to 100 micrometers, preferably 5 to 60 micrometers. This is done by employing spray application methods, such as, for example, compressed air spraying, airless spraying, high speed rotation, or electrostatic spray application (ESTA), alone or in conjunction with hot spray application such as hot air spraying, for example.

After the pigmented aqueous basecoat material has been applied, it may be dried by known techniques. For example, 1-component basecoat materials may be flashed at room temperature for 1 to 60 minutes and subsequently dried preferably at optionally slightly elevated temperatures of 30 to 80° C. Flashing and drying for the purposes of the present invention mean the evaporation of organic solvents and/or water, whereby the coating material becomes drier, but is not yet cured, or there is as yet no formation of a fully crosslinked coating film.

A commercially customary clearcoat material is then applied likewise by common techniques, the film thicknesses again being situated within the customary ranges, such as 5 to 100 micrometers, for example.

Following the application of the clearcoat material, it may be flashed at room temperature for 1 to 60 minutes, for example, and optionally dried. The clearcoat material is then cured together with the pigmented basecoat material applied. Here, for example, crosslinking reactions take place, to produce a multicoat color and/or effect paint system of the invention on a substrate. Curing takes place preferably thermally at temperatures from 60 to 200° C. Thermally curing basecoat materials are preferably those which comprise additionally a polyurethane resin binder and as crosslinking agent an amino resin or a blocked or nonblocked polyisocyanate, preferably an amino resin. Among the amino resins, melamine resins are preferred.

Plastics substrates are coated basically in the same way as for metallic substrates. Here, however, curing takes place generally at much lower temperatures, of 30 to 90° C. It is therefore preferred to use two-component clearcoat materials. In addition, it is preferred to use basecoat materials which comprise a polyurethane resin binder but no crosslinker.

With the aid of the method of the invention it is possible to coat metallic and nonmetallic substrates, especially plastics substrates, preferably motor vehicle bodies or parts thereof.

The method of the invention can be used, in addition, for the double coating in OEM finishing. This means that a substrate which has been coated using the method of the invention is painted a second time, again using the method of the invention.

The invention further relates to multicoat paint systems which are producible by the method described above. These multicoat paint systems will be referred to below as multicoat paint systems of the invention.

All of the abovementioned details relating to the polymer of the invention, to the pigmented aqueous basecoat material, and to the method of the invention also apply correspondingly in respect of the said multicoat paint system. This also applies not least in respect of all preferred, more preferred, and very preferred features.

The multicoat paint systems of the invention are preferably multicoat color paint systems, effect paint systems, and color and effect paint systems.

A further aspect of the invention relates to the method of the invention where said substrate from stage (1) is a multicoat paint system that has defect areas.

The method of the invention is suitable, accordingly, for remedying defect areas on multicoat paint systems. Defect areas or film defects are, generally, disruptions on and in the coating, usually named according to their shape or their appearance. The skilled person knows a multiplicity of possible kinds of such film defects. They are described for example in Römpp-Lexikon Lacke and Druckfarben, Georg Thieme Verlag, Stuttgart, New York, 1998, page 235, "Filmfehler" ["Film defects"].

The multicoat paint systems produced using the method of the invention may likewise exhibit such defect areas. In one preferred embodiment of the method of the invention, therefore, the substrate from stage (1) is a multicoat paint system of the invention that exhibits defect areas.

These multicoat paint systems are produced preferably on motor vehicle bodies or parts thereof, by means of the above-designated method of the invention, as part of automotive OEM finishing. Where such defect areas appear directly after OEM finishing, they are remedied directly. Hence the term OEM automotive refinish is also used. Where only small defect areas require remedy, a repair is carried out not to the whole body (double coating) but only to the "spot", as it is called. This operation is called "spot repair". Particularly preferable, therefore, is the use of the method of the invention for remedying defect areas on multicoat paint systems of the invention in OEM automotive refinish.

So that the area remedied does not differ, in terms of color, from the rest of the original finish, it is preferred for the aqueous basecoat material used in stage (1) of the method of the invention to remedy defect areas to be the same as that used in the method of the invention for producing the multicoat paint system of the invention.

The details given above concerning the polymer of the invention and concerning the aqueous pigmented basecoat material therefore also apply in respect of the as-discussed use of the method of the invention for remedying defect areas on a multicoat paint system. This applies in particular also for all preferred, more preferred, and very preferred features specified. It is preferred, moreover, for the multicoat paint systems of the invention that are to be remedied to be multicoat color paint systems, effect paint systems, and color and effect paint systems.

The above-described defect areas on the multicoat paint system of the invention can be remedied using the method of the invention described above. For this purpose, the surface of the multicoat paint system that is to be remedied may initially be sanded. This is followed by application of the pigmented aqueous basecoat material to the defect area in the original finish, by pneumatic spraying. Following the application of the pigmented aqueous basecoat material, it can be dried by known techniques. For example, the basecoat material can be dried at room temperature for 1 to 60 minutes, and can subsequently be dried at slightly elevated temperatures, if desired, of 30 to 80° C. Flashing and drying in the context of the present invention mean the evaporation of organic solvents and/or water, but not so as to fully cure the coating material. In the context of the present invention it is preferred for the basecoat material to comprise a polyurethane resin binder and as crosslinking agent an amino resin, preferably a melamine resin.

Subsequently a commercial clearcoat material is applied, by techniques that are likewise commonplace. Following the application of the clearcoat material, it can be flashed at room temperature for 1 to 60 minutes, for example, and optionally dried. The clearcoat material is then cured together with the applied pigmented basecoat material.

In the case of what is known as low-temperature baking, curing takes place preferably at temperatures from 20 to 90° C. Here it is preferred to use two-component clearcoat materials. If, as described above, a polyurethane resin is used as further binder and an amino resin is used as crosslinking agent, then at these temperatures there is only a low level of crosslinking in the basecoat film, as a result of the amino resin. Besides its function as a curing agent, the amino resin in this case also serves for plasticizing and is able to assist in pigment wetting. As well as the amino resins, nonblocked isocyanates can also be used. Depending on the nature of the isocyanate used, they crosslink from temperatures as low as 20° C.

In the case of what is called high-temperature baking, curing is accomplished preferably at temperatures from 130 to 150° C. Here, both one-component and two-component clearcoat materials are used. If, as described above, a polyurethane resin is used as further binder and an amino resin is used as crosslinking agent, then at these temperatures there is crosslinking in the basecoat film, as a result of the amino resin.

A further aspect of the present invention is the use of the polymer of the invention in pigmented aqueous basecoat materials for the purpose of promoting adhesion. By this is meant the promotion of adhesion with respect to those pigmented aqueous basecoat materials which do not contain any polymer of the invention.

The polymer of the invention can be used for promoting adhesion in the finishing of metallic and plastics substrates. It can also be used in automotive refinish. By automotive refinish is meant both the OEM automotive refinish and the automotive refinish of the kind which takes place in a workshop, for example.

Where said pigmented aqueous basecoat materials are used in the finishing of metallic and plastics substrates, the use of the polymer of the invention results more particularly in an improvement of the adhesion between the basecoat film and the clearcoat film immediately adjacent to it. The polymer of the invention is therefore used preferably for promoting adhesion between basecoat film and clearcoat film in the coating of metallic and plastics substrates.

Where the said pigmented aqueous basecoat materials are used in automotive refinish, the use of the polymer of the invention results more particularly in an improvement in adhesion between basecoat material and original finish. The polymer of the invention is therefore also used with preference for promoting the adhesion between basecoat and original finish in automotive refinishing, more preferably in OEM automotive refinishing.

The adhesion problem is especially striking when the coated substrates are exposed to weathering. Such weathering conditions can be simulated by heat-and-humidity storage conditions. This refers to the storage of coated substrates in a climatic chamber in accordance with test conditions CH of DIN EN ISO 6270-2:2005-09.

Consequently the polymers of the invention are also used more particularly for improving adhesion after heat-and-humidity storage. The adhesion is investigated preferably by means of a steam jet test in accordance with test method A of DIN 55662:2009-12.

If coated substrates are exposed to weathering, any poor adhesion is manifested not least in the occurrence of blisters and swelling. The polymers of the invention are therefore also used more particularly in order to reduce or prevent the occurrence of blisters and swelling. The presence of such blisters and swelling may be appraised visually.

The invention is elucidated below, using examples.

EXAMPLES

The dimer fatty acid used contains less than 1.5% by weight of trimeric molecules, 98% by weight of dimeric molecules, and an iodine number of <10 g/100 g. It is prepared on the basis of linolenic, linoleic, and oleic acids.
Polyester 1 (P1):
Prepared as per Example D, column 16, lines 37 to 59 of DE 4009858 A.
Polyester 2 (P2):
Prepared as per Example 5, page 18, paragraph 150, DE 102009018249 A1.
Inventive Binder 1 (BI1):
In a 4 l stainless steel reactor, equipped with anchor stirrer, thermometer, condenser, thermometer for overhead temperature measurement, and water separator, 2 mol of polyTHF1000, 579.3 g of dimer fatty acid (1 mol) and 51 g of cyclohexane were heated to 100° C. in the presence of 2.1 g of di-n-butyltin oxide (Axion® CS 2455, from Chemtura). Heating was continued slowly until the onset of condensation. At a maximum overhead temperature of 85° C., heating was then continued gradually up to 220° C. The progress of the reaction was monitored via determination of the acid number. When an acid number of ≥3 mg KOH/g was reached, remaining cyclohexane was removed by distillation under vacuum. This gave a viscous resin.
Condensate quantity (water): 34.9 g
Acid number: 2.7 mg KOH/g
Solids content (60 min at 130° C.): 100.0%
Molecular weight (calibration: PMMA standards):
Mn: 3900 g/mol
Mw: 7200 g/mol
Viscosity: 5549 mPas
(measured at 23° C. with a Brookfield CAP 2000+ rotary viscometer, spindle 3, shear rate: 1333 s$^{-1}$)
Inventive Binder 2 (BI2):
In the same was as for the synthesis of binder BI1, 2 mol of polypropylene glycol having an average molecular weight of 900 g/mol (Pluriol P900, BASF SE) and 1 mol of dimer fatty acid were esterified in the presence of 1.9 g of di-n-butyltin oxide (Axion® CS 2455, from Chemtura). This gave a viscous resin.
Condensate quantity (water): 35.2 g
Acid number: 0.3 mg KOH/g
Solids content (60 min at 130° C.): 100.0%
Molecular weight (calibration: PMMA standards):
Mn: 3400 g/mol
Mw: 7000 g/mol
Viscosity: 2003 mPas
(measured at 23° C. with a Brookfield CAP 2000+ rotary viscometer, spindle 3, shear rate: 1333 s$^{-1}$)
Noninventive Binder 1 (BC1):
In analogy to the above experiment, 2 mol of dimer fatty acid and 1 mol of polyTHF1000 were esterified in the presence of 1.7 g of di-n-butyltin oxide (Axion® CS 2455, from Chemtura). This gave a viscous resin.
Condensate quantity (water): 34.7 g
Acid number: 54.6 mg KOH/g
Solids content (60 min at 130° C.): 100.0%
Molecular weight (calibration: PMMA standards):
Mn: 2800 g/mol
Mw: 8100 g/mol
Viscosity: 19 793 mPas
(measured at 23° C. with a Brookfield CAP 2000+ rotary viscometer, spindle 3, shear rate: 307 s$^{-1}$)
Noninventive Binder 2 (BC2):
In analogy to the above experiment, 1 mol of polypropylene glycol having an average molecular weight of 900 g/mol (Pluriol P900, BASF SE) and 2 mol of dimer fatty acid were esterified in the presence of 1.6 g of di-n-butyltin oxide (Axion® CS 2455, from Chemtura). This gave a viscous resin.
Condensate quantity (water): 34.6 g
Acid number: 57.2 mg KOH/g
Solids content (60 min at 130° C.): 100.0%
Molecular weight (calibration: PMMA standards):
Mn: 2400 g/mol
Mw: 5800 g/mol
Viscosity: 7790 mPas
(measured at 23° C. with a Brookfield CAP 2000+ rotary viscometer, spindle 3, shear rate: 507 s$^{-1}$)
Examples of Paint Formulations
1. Preparation of a Silver Waterborne Basecoat material 1
The components listed in Table A under "aqueous phase" were stirred together in the order stated to form an aqueous mixture. In the next step, an organic mixture was prepared from the components listed under "Organic phase". The organic mixture was added to the aqueous mixture. The resulting mixture was then stirred for 10 minutes and adjusted using deionized water and dimethylethanolamine to a pH of 8 and a spray viscosity of 58 mPas under a shearing load of 1000 s$^{-1}$, measured using a rotary viscometer (Rheomat RM 180 instrument from Mettler-Toledo) at 23° C.

TABLE A

| Component | Parts by weight |
| --- | --- |
| Aqueous phase | |
| 3% strength Na Mg phyllosilicate solution | 26 |
| Deionized water | 13.6 |
| Butyl glycol | 2.8 |
| Polyurethane-modified polyacrylate; prepared as per page 7, line 55 to page 8, line 23 of DE 4437535 A | 4.5 |
| 50% strength by weight solution of DSX 1550 (BASF), rheological agent | 0.6 |
| P1 | 3.2 |
| Tensid S (BASF), surfactant | 0.3 |
| Melamine-formaldehyde resin (Cymel 203 from Cytec | 4.1 |
| 10% strength dimethylethanolamine in water | 0.3 |
| Graft copolymer based on polyurethane; prepared as per page 19, line 44 to page 20, line 21 of DE 19948004 A | 20.4 |
| Tensid S (BASF), surfactant | 1.6 |
| 3% strength by weight aqueous solution of Viscalex HV 30; rheological agent, available from BASF | 3.9 |
| Organic phase | |
| Mixture of two commercial aluminum pigments, available from Altana-Eckart | 6.2 |
| Butyl glycol | 7.5 |
| P1 | 5 |

Waterborne Basecoat Material E1:

To prepare the inventive waterborne basecoat material E1, a coating material was prepared in analogy to the preparation of waterborne basecoat material 1, using BI1 rather than the polyester P1 in both the aqueous phase and the organic phase.

Waterborne Basecoat Material E2:

To prepare the noninventive waterborne basecoat material E2, a coating material was prepared in analogy to the preparation of waterborne basecoat material 1, using BC1 rather than the polyester P1 in both the aqueous phase and the organic phase.

Waterborne Basecoat Material E3:

To prepare the inventive waterborne basecoat material E3, a coating material was prepared in analogy to the preparation of waterborne basecoat material 1, using BI2 rather than the polyester P1 in both the aqueous phase and the organic phase.

Waterborne Basecoat Material E4:

To prepare the noninventive waterborne basecoat material E4, a coating material was prepared in analogy to the preparation of waterborne basecoat material 1, using BC2 rather than the polyester P1 in both the aqueous phase and the organic phase.

TABLE 1

Compositions of waterborne basecoat materials 1 and E1 to E4

| WBM | [% by weight] | Polymer |
| --- | --- | --- |
| 1 | 4.92 | P1 |
| E1 | 4.92 | BI1 |
| E2 | 4.92 | BC1 |
| E3 | 4.92 | BI2 |
| E4 | 4.92 | BC2 |

The weight percentage figures in Table 1 are based on the total weight of the waterborne basecoat material.

Comparison Between Waterborne Basecoat Material 1 and Waterborne Basecoat Materials E1 to E4

In order to determine the stability toward occurrence of blisters and swelling after heat-and-humidity storage, the multicoat paint systems were produced in accordance with the following general procedure:

A steel panel with dimensions of 10×20 cm, coated with a standard cathodic electrocoat (Cathoguard® 800 from BASF Coatings GmbH), was coated with a standard medium-gray primer-surfacer (ALG 670173 from Hemmelrath). After preliminary drying of the aqueous primer-surfacer over a period of 10 minutes at 80° C., it was baked at a temperature of 190° C. over a period of 30 minutes.

Each waterborne basecoat material of Table 1 was then applied pneumatically. The resulting waterborne basecoat film was flashed at room temperature for 2 minutes and then dried for 10 minutes in a forced-air oven at 70° C. Over the dried waterborne basecoat film, a customary two-component clearcoat material was applied (Progloss® 345 from BASF Coatings GmbH). The resulting clearcoat film was flashed for 20 minutes at room temperature. Subsequently, the waterborne basecoat film and the clearcoat film were cured in a forced-air oven at 160° C. for 30 minutes. The present system represents an overbaked original system and is referred to below as original finish.

This original finish is sanded with an abrasive paper, after which each of the waterborne basecoat materials from Table 1 is pneumatically applied to this sanded original finish. The resulting waterborne basecoat film was flashed at room temperature for 2 minutes and then dried for 10 minutes in a forced-air oven at 70° C. Over the dried waterborne basecoat film, a so-called 80° C. two-component clearcoat material (FF230500 2K refinish clearcoat, scratch-resistant from BASF Coatings GmbH) was applied. The resulting clearcoat film was flashed at room temperature for 20 minutes. Subsequently, the waterborne basecoat film and the clearcoat film were cured in a forced-air oven at 80° C. for 30 minutes.

The steel panels thus treated were then stored over a period of 10 days in a climatic chamber in accordance with test conditions CH of DIN EN ISO 6270-2:2005-09. Subsequently, 24 hours following their removal from the climatic chamber, the panels were inspected for blistering and swelling.

The occurrence of blisters was assessed as follows through a combination of 2 values:

The number of blisters was evaluated by a quantity rating of 1 to 5, with m1 denoting very few blisters and m5 very many blisters.

The size of the blisters was evaluated by a size rating, again from 1 to 5, with g1 denoting very small blisters and g5 denoting very large blisters.

The designation m0g0, accordingly, denotes a blister-free finish after heat-and-humidity storage, and represents a satisfactory result in terms of blistering.

TABLE 2

Blistering and swelling of waterborne basecoat material 1 and waterborne basecoat materials E1 to E4

| WBM | Blistering | Swelling | Assessment |
| --- | --- | --- | --- |
| 1 | m5g1 | none | unsat. |
| E1 | m0g0 | none | sat. |
| E2 | m2g1 | none | unsat. |

TABLE 2-continued

Blistering and swelling of waterborne basecoat
material 1 and waterborne basecoat materials E1 to E4

| WBM | Blistering | Swelling | Assessment |
|---|---|---|---|
| E3 | m0g0 | none | sat. |
| E4 | m3g1 | none | unsat. |

Key:
m = number of blisters
g = size of blisters
sat. = satisfactory result
unsat. = unsatisfactory result The results confirm that when using the polyesters of the invention there are no longer any blisters after heat-and-humidity exposure and there is no longer any visible swelling.

2. Preparation of a Red Metallic Waterborne Basecoat Material 2

The components listed in Table B under "aqueous phase" were stirred together in the order stated to form an aqueous mixture. In the next step, an organic mixture was prepared from the components listed under "Organic phase". The organic mixture was added to the aqueous mixture. The resulting mixture was then stirred for 10 minutes and adjusted using deionized water and dimethylethanolamine to a pH of 8 and a spray viscosity of 85 mPas under a shearing load of 1000 $s^{-1}$, measured using a rotary viscometer (Rheomat RM 180 instrument from Mettler-Toledo) at 23° C.

TABLE B

| Component | Parts by weight |
|---|---|
| Aqueous phase | |
| 3% strength Na Mg phyllosilicate solution | 19.0 |
| Polyurethane dispersion; prepared as per page 14, lines 38 to 53 of EP1358278 B1 | 15.0 |
| Butyl glycol | 2.0 |
| Polyester P1 | 3.6 |
| 10% strength dimethylethanolamine in water | 1.0 |
| Resimene ® HM-2608; melamine-formaldehyde resin, available from Ineos | 3.0 |
| Polyurethane-modified polyacrylate; prepared as per page 7, line 55 to page 8, line 23 of DE-A-4437535 | 3.0 |
| Deionized water | 19.7 |
| 50% strength by weight solution of DSX 1550 (BASF), rheological agent | 0.5 |
| 2-Ethylhexanol | 1.0 |
| Pluriol ® P900; polypropylene glycol, available from BASF | 0.8 |
| 3% strength by weight aqueous solution of Viscalex HV 30; rheological agent, available from BASF, in water | 4.0 |
| Red paste | 14.0 |
| Carbon black paste | 0.1 |
| Effect substance suspensions | |
| PALIOCROM ® ORANGE L2804; coated aluminum pigment, available from BASF | 3.0 |
| Mixture of two commercial aluminum pigments, available from Altana-Eckart | 0.4 |
| Butyl glycol | 3.5 |
| Mixing varnish; prepared as per page 14, lines 15-27 of EP1799783 A1 | 6.4 |

Preparation of the Red Paste:

The red paste was prepared from 45.0 parts by weight of an acrylated polyurethane dispersion, prepared in accordance with international patent application WO 91/15528, binder dispersion A, and from 21.0 parts by weight of Paliogen® red L 3885, 0.7 part by weight of dimethylethanolamine, 2.5 parts by weight of 1,2-propylene glycol and 30.8 parts by weight of deionized water.

Preparation of the Carbon Black Paste:

The carbon black paste was prepared from 25 parts by weight of an acrylated polyurethane dispersion, prepared in accordance with international patent application WO 91/15528, binder dispersion A, and from 10 parts by weight of carbon black, 0.1 part by weight of methyl isobutyl ketone, 1.36 parts by weight of dimethylethanolamine, 2 parts by weight of a commercial polyether (Pluriol® P900 from BASF Aktiengesellschaft) and 61.45 parts by weight of deionized water.

Waterborne Basecoat Material E5:

To prepare the noninventive waterborne basecoat material E5, a coating material was prepared in analogy to the preparation of waterborne basecoat material 2, using BI1 rather than the Resimene HM-2608 melamine-formaldehyde resin, available from Ineos in the aqueous phase.

Waterborne Basecoat Material E6:

To prepare the noninventive waterborne basecoat material E6, a coating material was prepared in analogy to the preparation of waterborne basecoat material 2, using polyester P1 rather than the Resimene HM-2608 melamine-formaldehyde resin, available from Ineos in the aqueous phase.

Waterborne Basecoat Material E7:

To prepare the noninventive waterborne basecoat material E7, a coating material was prepared in analogy to the preparation of waterborne basecoat material 2, using polyester P2 rather than the Resimene HM-2608 melamine-formaldehyde resin, available from Ineos in the aqueous phase.

TABLE 3

Compositions of waterborne basecoat materials 2 and E5 to E7

| WBM | [% by weight] | MFR or MFR substitute |
|---|---|---|
| 2 | 2.7 | Resime HM-2608 |
|  | 2.16 | P1 |
| E5 | 2.7 | BI1 |
|  | 2.16 | P1 |
| E6 | 2.7 | P1 |
|  | 2.16 | P1 |
| E7 | 2.7 | P2 |
|  | 2.16 | P1 |

The weight percentage figures in Table 3 are based on the total weight of the waterborne basecoat material.

MFR=melamine-formaldehyde resin

Comparison Between Waterborne Basecoat Material 2 and Waterborne Basecoat Materials E5-E7

In order to determine the stability toward occurrence of blisters and swelling after heat-and-humidity storage, the finishes on plastic were produced in accordance with the following general procedure:

A plastics substrate made of PP-EPDM (Hifax EKC 112X from Lyondell-Basell) was cleaned with a degreaser and then briefly flamed using a laboratory flaming device with a blue oxidizing flame.

Flaming Parameter Settings:

| Speed | 0.13 m/s |
|---|---|
| Flame-to-substrate distance | 5 cm |
| Gas (propane) | 258 L/h |
| Air | 6600 L/h |
| Gas/air mix | 1:26 |

Then a 2-component (2K) primer-surfacer (slate-gray, R1471, with curing agent WW60738 100:10, from Worwag) was applied to the panels, which were flashed at room temperature for 10 minutes and then dried for 30 minutes in a forced-air oven at 80° C. The waterborne basecoat material was applied pneumatically. The resulting waterborne basecoat film was flashed at room temperature for 2 minutes and then dried for 10 minutes in a forced-air oven at 70° C. Over the dried waterborne basecoat film, a customary low-bake 80° C. two-component clearcoat material (EverGloss® 905 from BASF Coatings GmbH) was applied. The resulting clearcoat film was flashed at room temperature for 10 minutes. Then the waterborne basecoat film and the clearcoat film were cured in a forced-air oven at 80° C. for 40 minutes. The present system represents an original system for plastic parts for installation in or on vehicles.

The panels were stored at room temperature for seven days. They were then stored under heat-and-humidity conditions, test conditions CH according to DIN EN ISO 6270-2:2005-09 (test duration 10 days).

30 minutes and 24 hours after removal from the climatic chamber, the panels were inspected for blistering and swelling.

Additionally, after 24 hours, a steam jet test was carried out in accordance with test method A of DIN 55662:2009-12. Following steam jet exposure, the test specimen is inspected for detachment of the paint surface and detachment at the diagonal cross. An evaluation is made of the degree of damage, in accordance with the diagrams in FIG. 4, section 9.2 of DIN 55662:2009-12. For the purposes of the evaluation, minor delaminations of up to 1 mm, resulting from adverse cutting at the cross-cut, are disregarded. After the steam jet test there must be no delamination of the coating films.

TABLE 4

Blisters/swelling/steam jet test of waterborne basecoat material 2 and waterborne basecoat materials E5 to E7

| WBM | Blistering/ swelling 0.5 h | Blistering/ swelling 24 H | Steam jet |
|---|---|---|---|
| 2 | m2g1/severe | m1g1/moderate | unsat. 4a BC/CC |
| E5 | m0g0/slight | m0g0/none | sat. |
| E6 | m3g1/severe | m2g1/moderate | unsat. 3a BC/CC |
| E7 | m2g1/severe | m1g1/moderate | unsat. 2a BC/CC |

Key:
m = number of blisters
g = size of blisters
sat. = satisfactory result
unsat. = unsatisfactory result
BC/CC = basecoat-clearcoat separation plane
4a, 3a and 2a refer to the characteristic values in DIN 55662.

The results show clearly that when using the polyesters of the invention there are no longer any blisters after heat-and-humidity exposure and there is no longer any visible swelling. Furthermore, the basecoat-clearcoat adhesion has significantly improved.

3. Preparation of a Silver Waterborne Basecoat Material 3

The components listed in Table C under "aqueous phase" were stirred together in the order stated to form an aqueous mixture. In the next step, an organic mixture was prepared from the components listed under "Organic phase". The organic mixture was added to the aqueous mixture. The resulting mixture was then stirred for 10 minutes and adjusted using deionized water and dimethylethanolamine to a pH of 8 and a spray viscosity of 58 mPas under a shearing load of 1000 s$^{-1}$, measured using a rotary viscometer (Rheomat RM 180 instrument from Mettler-Toledo) at 23° C.

TABLE C

| Component | Parts by weight |
|---|---|
| Aqueous phase | |
| 3% strength Na Mg phyllosilicate solution | 26 |
| Deionized water | 21.7 |
| Butyl glycol | 2.8 |
| Polyurethane-modified polyacrylate; prepared as per page 7, line 55 to page 8, line 23 of DE 4437535 A | 4.5 |
| 50% strength by weight solution of DSX 1550 (BASF), rheological agent | 0.6 |
| P1 | 13.3 |
| Tensid S (BASF), surfactant | 0.3 |
| Melamine-formaldehyde resin (Cymel 203 from Cytec | 4.1 |
| 10% strength dimethylethanolamine in water | 0.3 |
| Graft copolymer based on polyurethane; prepared as per page 19, line 44 to page 20, line 21 of DE 19948004 A | 1.8 |
| Tensid S (BASF), surfactant | 1.6 |
| 3% strength by weight aqueous solution of Viscalex HV 30; rheological agent, available from BASF | 3.9 |
| Organic phase | |
| Mixture of two commercial aluminum pigments, available from Altana-Eckart | 6.2 |
| Butyl glycol | 7.5 |
| P1 | 5 |

Waterborne Basecoat Material E8:

To prepare the inventive waterborne basecoat material E8, a coating material was prepared in analogy to the preparation of waterborne basecoat material 3, using BI1 rather than the polyester P1 in both the aqueous phase and the organic phase.

Waterborne Basecoat Material E9:

To prepare the noninventive waterborne basecoat material E9, a coating material was prepared in analogy to the preparation of waterborne basecoat material 3, using BC1 rather than the polyester P1 in both the aqueous phase and the organic phase.

Waterborne Basecoat Material E10:

To prepare the inventive waterborne basecoat material E10, a coating material was prepared in analogy to the preparation of waterborne basecoat material 3, using BI2 rather than the polyester P1 in both the aqueous phase and the organic phase.

Waterborne Basecoat Material E11:

To prepare the noninventive waterborne basecoat material E11, a coating material was prepared in analogy to the preparation of waterborne basecoat material 3, using BC2 rather than the polyester P1 in both the aqueous phase and the organic phase.

TABLE 5

Compositions of waterborne basecoat materials 3 and E8 to E11

| WBM | [% by weight] | Polymer |
|---|---|---|
| 3 | 10.98 | P1 |
| E8 | 10.98 | BI1 |
| E9 | 10.98 | BC1 |
| E10 | 10.98 | BI2 |
| E11 | 10.98 | BC2 |

The weight percentage figures in Table 1 are based on the total weight of the waterborne basecoat material.

Comparison Between Waterborne Basecoat Material 3 and Waterborne Basecoat Materials E8 to E11

In order to determine the stability toward occurrence of blisters and swelling after heat-and-humidity storage, the multicoat paint systems were produced in accordance with the following general procedure:

A steel panel with dimensions of 10×20 cm, coated with a standard cathodic electrocoat (Cathoguard® 800 from BASF Coatings GmbH), was coated with a standard medium-gray primer-surfacer (ALG 670173 from Hemmelrath). After preliminary drying of the aqueous primer-surfacer over a period of 10 minutes at 80° C., it was baked at a temperature of 190° C. over a period of 30 minutes.

Each waterborne basecoat material of Table 5 was then applied pneumatically. The resulting waterborne basecoat film was flashed at room temperature for 2 minutes and then dried for 10 minutes in a forced-air oven at 70° C. Over the dried waterborne basecoat film, a customary two-component clearcoat material was applied (Progloss® 345 from BASF Coatings GmbH). The resulting clearcoat film was flashed for 20 minutes at room temperature. Subsequently, the waterborne basecoat film and the clearcoat film were cured in a forced-air oven at 160° C. for 30 minutes. The present system represents an overbaked original system and is referred to below as original finish.

This original finish is sanded with an abrasive paper, after which each of the waterborne basecoat materials from Table 5 is applied pneumatically to this sanded original finish. The resulting waterborne basecoat film was flashed at room temperature for 2 minutes and then dried for 10 minutes in a forced-air oven at 70° C. Over the dried waterborne basecoat film, a so-called 80° C. two-component clearcoat material (FF230500 2K refinish clearcoat, scratch-resistant from BASF Coatings GmbH) was applied. The resulting clearcoat film was flashed at room temperature for 20 minutes. Subsequently, the waterborne basecoat film and the clearcoat film were cured in a forced-air oven at 80° C. for 30 minutes.

The steel panels thus treated were then stored over a period of 10 days in a climatic chamber in accordance with test conditions CH of DIN EN ISO 6270-2:2005-09. Subsequently, 24 hours following their removal from the climatic chamber, the panels were inspected for blistering and swelling.

The occurrence of blisters was assessed as follows through a combination of 2 values:
The number of blisters was evaluated by a quantity rating of 1 to 5, with m1 denoting very few blisters and m5 very many blisters.
The size of the blisters was evaluated by a size rating, again from 1 to 5, with g1 denoting very small blisters and g5 denoting very large blisters.
The designation m0g0, accordingly, denotes a blister-free finish after heat-and-humidity storage, and represents a satisfactory result in terms of blistering.

TABLE 6

Blistering and swelling of waterborne basecoat material 3 and waterborne basecoat materials E8 to E11

| WBM | Blistering | Swelling | Assessment |
| --- | --- | --- | --- |
| 3 | m5g4 | none | unsat. |
| E8 | m0g0 | none | sat. |
| E9 | m3g2 | none | unsat. |
| E10 | m0g0 | none | sat. |
| E11 | m2g2 | none | unsat. |

Key:
m = number of blisters
g = size of blisters
sat. = satisfactory result
unsat. = unsatisfactory result The results confirm that when using the polyesters of the invention there are no longer any blisters after heat-and-humidity exposure and there is no longer any visible swelling.

The invention claimed is:

1. A polymer comprising the reaction product of
(a) dimer fatty acids with
(b) at least one polyether of general structural formula (I)

(I)

where R is a $C_4$ to $C_6$ alkylene radical and n is selected accordingly such that said polyether has a number-average molecular weight of 450 to 2200 g/mol, components (a) and (b) are used in a molar ratio of 0.7/2.3 to 1.3/1.7, and the resulting polymer has a number-average molecular weight of 1500 to 5000 g/mol and an acid number of <10 mg KOH/g,
wherein when the polymer is incorporated into a pigmented aqueous basecoat material, the pigmented aqueous basecoat material is effective to form a film upon application to a substrate.

2. The polymer of claim 1, wherein the dimer fatty acids used comprise at least 90% by weight of dimeric molecules, less than 5% by weight of trimeric molecules, and less than 5% by weight of monomeric molecules and other by-products.

3. The polymer of claim 1, wherein the dimer fatty acid used is prepared from linolenic, linoleic and/or oleic acid and comprises at least 98% by weight of dimeric molecules, less than 1.5% by weight of trimeric molecules, and less than 0.5% by weight of monomeric molecules and other by-products, and has an iodine number of <10 g/100 g.

4. The polymer of claim 1, wherein the polyether of general structural formula (I) is polytetrahydrofuran and comprises a number-average molecular weight of 800 to 1200 g/mol.

5. The polymer of claim 1, wherein components (a) and (b) are used in a molar ratio of 0.9/2.1 to 1.1/1.9.

6. The polymer of claim 1, wherein the resulting polymer has a number-average molecular weight of 3000 to 4000 g/mol.

7. The polymer of claim 1, wherein the resulting polymer has an acid number of <5 mg KOH/g.

8. A pigmented aqueous basecoat material comprising at least one polymer comprising the reaction product of
(a) dimer fatty acids with
(b) at least one polyether of general structural formula (I)

(I)

where R is a $C_3$ to $C_6$ alkylene radical and n is selected accordingly such that said polyether has a number-average molecular weight of 450 to 2200 g/mol, components (a) and (b) are used in a molar ratio of 0.7/2.3 to 1.3/1.7, and the resulting polymer has a number-average molecular weight of 1500 to 5000 g/mol and an acid number of <10 mg KOH/g, wherein the pigmented aqueous basecoat material is effective to form a film upon application to a substrate.

9. The pigmented aqueous basecoat material of claim 8, wherein the at least one polymer is present in an amount of 0.1% to 30% by weights, based on the total weight of the pigmented aqueous basecoat material.

10. The pigmented aqueous basecoat material of claim 8, further comprising, as a further binder, at least one polyurethane resin.

11. The pigmented aqueous basecoat material of claim 8, wherein the polyether general structural formula (I) is polypropylene glycol or polytetrahydrofuran and comprises a number-average molecular weights of 800 to 1200 g/mol.

12. A method of promoting adhesion, comprising adding a polymer to a pigmented aqueous basecoat material, the polymer comprising the reaction product of
(a) dimer fatty acids with
(b) at least one polyether of general structural formula (I)

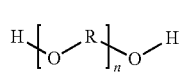

(I)

where R is a $C_3$ to $C_6$ alkylene radical and n is selected accordingly such that said polyether has a number-average molecular weight of 450 to 2200 g/mol, components (a) and (b) are used in a molar ratio of 0.7/2.3 to 1.3/1.7, and the resulting polymer has a number-average molecular weight of 1500 to 5000 g/mol and an acid number of <10 mg KOH/g, wherein when the polymer is incorporated into the pigmented aqueous basecoat material, the pigmented aqueous basecoat material is effective to form a film upon application to a substrate.

13. The method of claim 12, wherein the polyether of general structural formula (I) is polypropylene glycol or polytetrahhydrofuran and comprises a number-average molecular weight of 800 to 1200 g/mol.

14. A method for producing a multicoat paint system, comprising
(1) applying the pigmented aqueous basecoat material of claim 8 to a substrate,
(2) forming a basecoat film,
(3) applying a clearcoat material to the basecoat film, and subsequently
(4) curing the basecoat film together with the clearcoat film.

15. The method of claim 14, wherein said substrate from stage (1) comprises a multicoat paint system which has defect areas.

16. A multicoat paint system made by the method of claim 14.

17. A pigmented aqueous basecoat material comprising at least one polymer comprising the reaction product of
(a) dimer fatty acids consisting of at least 90% by weight of dimeric molecules and less than 5% by weight of trimeric molecules with
(b) at least one polyether of general structural formula (I)

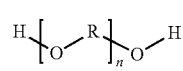

(I)

where R is a $C_3$ to $C_6$ alkylene radical and n is selected accordingly such that said polyether has a number-average molecular weight of 450 to 2200 g/mol, components (a) and (b) are used in a molar ratio of 0.7/2.3 to 1.3/1.7, and the resulting polymer has a number-average molecular weight of 1500 to 5000 g/mol and an acid number of <10 mg KOH/g, wherein the pigmented aqueous basecoat material is effective to form a film upon application to a substrate.

* * * * *